United States Patent [19]
Voigt et al.

[11] Patent Number: 5,435,366
[45] Date of Patent: Jul. 25, 1995

[54] PNEUMATIC TIRE WITH TREAD HAVING GOOD AQUA-PLANING PERFORMANCE AND GOOD WINTER CHARACTERISTICS

[75] Inventors: Karl G. Voigt, Rodenbach; Dieter Krenz, Linsengericht, both of Germany

[73] Assignee: SP Reifenwerke GmbH, Hanau, Germany

[21] Appl. No.: 180,292

[22] Filed: Jan. 12, 1994

[30] Foreign Application Priority Data

Jan. 13, 1993 [DE] Germany ............ 43 00 695.7

[51] Int. Cl.⁶ .............. B60C 11/12; B60C 101/00
[52] U.S. Cl. .................. 152/209 R; D12/147
[58] Field of Search ........ 152/209 R, 209 D; D12/146–149

[56] References Cited

U.S. PATENT DOCUMENTS

| | | | |
|---|---|---|---|
| D. 278,423 | 4/1985 | Baus | D12/147 |
| D. 283,499 | 4/1986 | Hammond | D12/146 |
| D. 287,955 | 1/1987 | Hayakawa et al. | D12/147 |
| D. 314,538 | 2/1991 | Martin | D12/147 |
| D. 316,991 | 5/1991 | Graas | D12/147 |
| D. 317,740 | 6/1991 | Takehara | D12/146 |
| D. 335,478 | 5/1993 | Slingluff et al. | D12/146 |
| D. 335,643 | 5/1993 | Hino | D12/147 |
| D. 341,346 | 11/1993 | Himuro et al. | D12/147 |
| 4,166,490 | 9/1979 | Poque | 152/209 R |
| 4,178,199 | 12/1979 | Lippmann et al. | 152/209 R |
| 5,158,626 | 10/1992 | Himuro | 152/209 R |

FOREIGN PATENT DOCUMENTS

| | | |
|---|---|---|
| 0296605 | 12/1988 | European Pat. Off. . |
| 0485778 | 5/1992 | European Pat. Off. . |
| 0485883 | 5/1992 | European Pat. Off. . |
| 9002986 | 4/1991 | Germany . |
| 0043803 | 2/1988 | Japan .......... 152/209 D |
| 4024105 | 1/1992 | Japan .......... 152/209 D |
| 4078701 | 3/1992 | Japan .......... 152/209 R |
| 4185509 | 7/1992 | Japan .......... 152/209 R |

*Primary Examiner*—Adrienne Johnstone

[57] ABSTRACT

A tire tread for pneumatic vehicle tires comprising tread blocks of a central block row separated from one another by inclined grooves which consist of two angularly extending groove sections which meet at the central circumferential plane. Furthermore, two circumferential grooves extend at an acute angle to the circumferential plane of the tire in the region of the blocks which bound them at the sides.

25 Claims, 1 Drawing Sheet

PNEUMATIC TIRE WITH TREAD HAVING GOOD AQUA-PLANING PERFORMANCE AND GOOD WINTER CHARACTERISTICS

The invention relates to a tire tread for pneumatic vehicle tires comprising a central row of blocks, extending in the circumferential direction of the tire and rows of blocks located in the shoulder regions separated from the central row by circumferential grooves.

Known patterns of this kind frequently have the disadvantage that the aqua-planing behavior and the winter characteristics leave something to be desired.

SUMMARY OF THE INVENTION

The object of the invention is accordingly to provide a tread for pneumatic vehicle tires which have both an improved aqua-planing behaviour and also improved winter characteristics.

According to one aspect of the invention a tire tread for pneumatic vehicle tires comprises a central row of blocks extending in the direction of the tire circumference and rows of blocks located in the shoulder regions and separated from the central row by circumferential grooves, wherein the tread blocks of the central row are mutually separated by inclined grooves which comprise two groove sections extending at an angle to and meeting each other at the central circumferential plane, and in that the two circumferential grooves extend at an acute angle to the tire circumferential plane in the region of the blocks which they bound laterally.

As a result of the invention a block profile having a specified direction of running is provided, with both good aqua-planing performance and good winter characteristics, in particular, traction in snow and the braking characteristics are substantially improved through the special layout of the inclined and circumferential grooves, and thus of the shaped blocks.

The two angularly extending inclined groove which meet at the central circumferential plane can be arranged such that they lie ideally in the outflow direction of the water, with the water being led away to both sides from the central circumferential plane. The circumferential grooves which extend regionally at an acute angle to the circumferential plane of the tire, i.e. to the central circumferential plane, or to a plane parallel hereto, provide for good ejection of snow and self-cleaning characteristics of the vehicle tire.

The groove sections of the two inclined grooves are preferably arranged at the same angle with respect to the central circumferential plane, in particular at an angle of approximately 50°. The alignment of the two groove sections is hereby symmetrical to the central circumferential plane. Furthermore, very favourable driving characteristics can be achieved on wet and wintry road when the two groove sections of the inclined grooves are slightly curved.

In accordance with a particularly preferred embodiment, the inclined grooves widen towards the circumferential grooves, with the boundary walls of the inclined grooves mutually enclosing an angle of preferably 10°. In this way, particularly good water drainage is ensured towards the circumferential grooves, which are made correspondingly broad.

The side edges of the blocks arranged in the shoulder regions are advantageously arranged at a larger acute angle to the circumferential plane of the tire than the side edges of the blocks of the central row of blocks. In this way the peripheral grooves broaden in a direction opposite to the direction of running in the region of the lateral blocks which bound it, whereby the ejection of snow and the self-cleaning effect of the tire are further improved.

Particularly good aqua-planing characteristics are furthermore achieved when, in accordance with a particular embodiment, the blocks located in the shoulder regions are mutually separated by substantially straight transverse grooves which essentially have the same width as the inclined grooves close to the circumferential grooves and which extend at an angle of approximately 75° to the circumferential plane of the tire.

It is furthermore advantageous when, in accordance with a further embodiment of the invention, a relatively high number of blocks, preferably 56–58 or 60–64 blocks, depending on the tire diameter, are distributed around the tire circumference for each row of blocks. In this way a large number of transverse edges are provided which has the consequence of good traction in snow and increased braking grip effect. The increased number of inclined and transverse grooves improves furthermore the drainage effect and thus the aqua-planing behavior.

The blocks in the shoulder region are preferably arranged displaced in the circumferential direction relative to the blocks of the central row of blocks. A design of this kind leads in particular to a reduction of running noise and to an improvement in the running stability on a dry road.

In accordance with a further embodiment the blocks have a plurality of sipes arranged perpendicular to the direction of running. In this way the traction and the braking effect in snow are in particular improved. Furthermore, positive influences on the lateral stability and steering effect also results because slippage sets in later. At the same time, the lateral stability of the profile blocks is maintained as a result of the perpendicular arrangement of the sipes, which also has a positive effect on the driving behavior, and in particular on the steering characteristics.

In accordance with a further advantageous embodiment of the invention, the sipes are formed with the maximum pattern depth and only have smaller depths at the edges of a block. A design of this kind improves the opening of the sipes and hereby leads to elevated traction in snow and also to an improved self-cleaning of the pattern.

BRIEF DESCRIPTION OF THE DRAWING

Further aspects of the invention will be apparent from the following description of an embodiment in conjunction with the attached FIGURE which shows a schematic partial plan view of a tread layout in accordance with the invention.

DETAILED DESCRIPTION OF THE PREFERRED EMBODIMENTS

Figure 1:
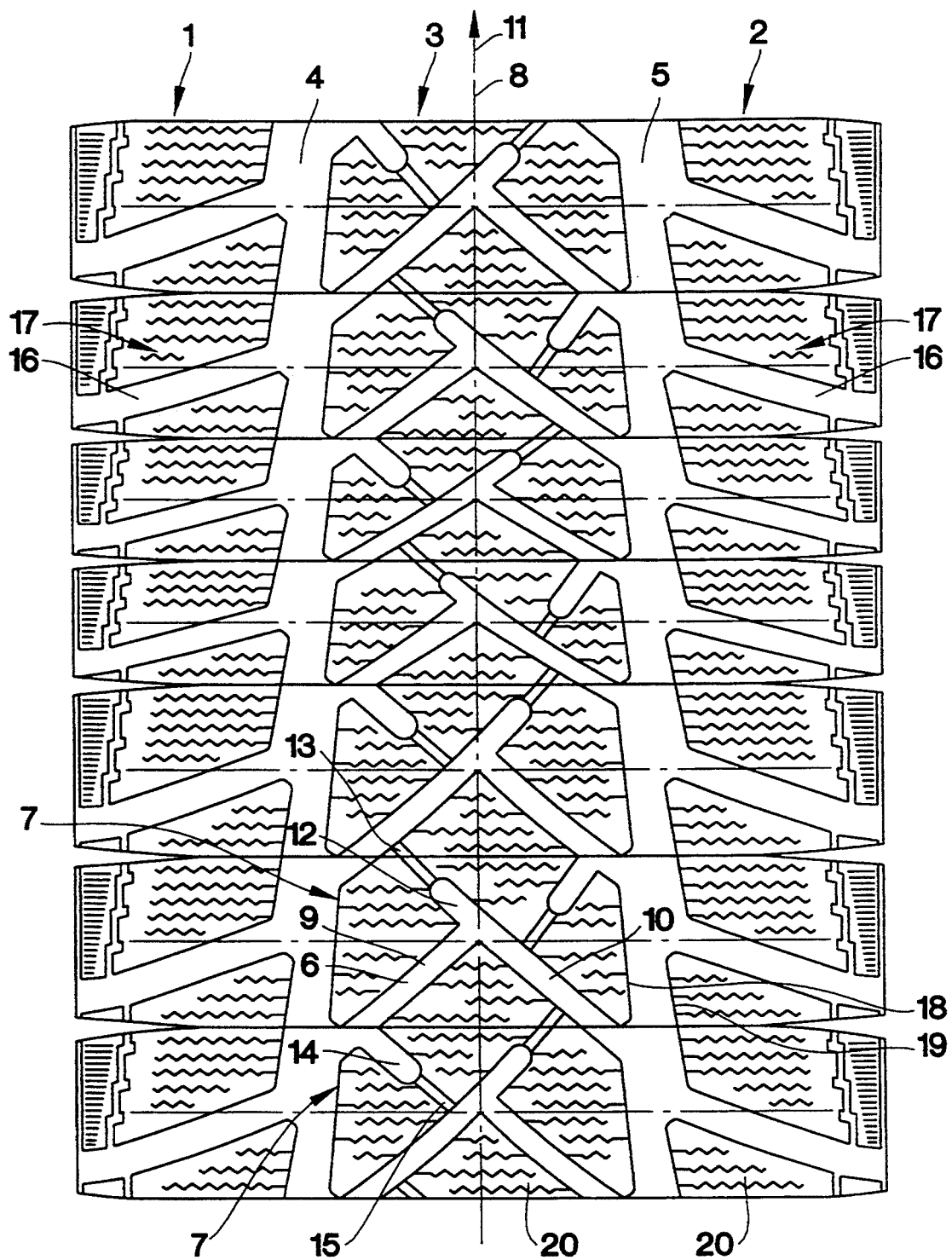

Between two circumferentially extending rows of blocks 1,2 in the shoulder regions of the vehicle tire, there is located a central row of blocks 3 which likewise extends in the circumferential direction of the tire and is separated from the shoulder row of blocks 1,2 by circumferential grooves 4,5.

The central row 3 is subdivided by inclined grooves 6 into individual tread blocks 7 which are arranged centrally to the central circumferential plane 8.

The inclined grooves 6 consist of groove sections 9,10 which extend at an angle to one another and meet at the central circumferential plane 8. These groove sections 9,10 respectively extend at an angle of from 40° to 60° and, in particular, approximately 50° to the central circumferential plane 8 and are aligned in such a way that the point at which they open into each other points forward in the direction of running of the tire. The direction of running of the tire is shown and made clear by the arrow 11. Furthermore, the groove sections 9,10 are slightly curved, with the concave side facing forwards in the direction of running.

In order to improve water drainage, the groove sections 9,10 broaden towards the circumferential grooves 4,5 with the boundary walls of each grooves section 9,10 including an angle in the axial direction with one another of from 5° to 15° and particularly approximately 10°.

The groove section 10 illustrated in the FIGURE is extended beyond the groove section 9 by means of a groove extension section 12 of the same width which extends through approximately half of the tread block 7. Starting from this groove extension section 12 a connecting groove 13 of smaller width continue in its longitudinal direction up to the inclined groove which follows in the direction of running.

The groove section 9 which extends at an angle to the groove section 10m has in turn a groove extension 14 in the vicinity of the circumferential groove, with the groove extension 14 branching off at right angles from the groove section 9 and extending towards the rear inclined groove in the direction of running, through approximately half the tread block 7. Starting from this groove extension 14, a connecting groove 15 of lesser width is continued in its longitudinal direction up to the rear inclined groove in the direction of running.

The widths of the groove extension 14 and of the groove extension section 12 are substantially the same and amount to approximately 30% of the width of the tread blocks 7 measured perpendicularly to the groove section 9 or 10. The width of the groove sections 9 or 10 in the vicinity of the central circumferential plane 8 likewise amounts to approximately 30% of the width of the tread blocks 7.

The central row 3 consists of two kinds of tread blocks 7 which are distinguished in that, for the first kind, the groove extension section 12 and the connecting groove 13 extend into the left half of the tread blocks 7 with respect to the central circumferential plane, whereas in the second kind the groove extension section 12 and the connecting section 13 are located to the right of the central circumferential plane 8. Furthermore, with the first kind of tread blocks 7, the groove extension 14 and the connecting groove 15 are arranged on the right-hand side of the central circumferential plane, whereas, with the second kind of profile blocks 7 these lie on the left-hand side of the central circumferential plane 8. In the circumferential direction of the tire, the two types of tread blocks alternate, so that in each case the next but one tread block is identical. Apart from the arrangement of the groove extension section 12, the groove projection 14 and the connecting grooves 13,15, the tread blocks 7 are, however, identical and have an arrow-shaped form as a result of the inclined grooves 9, the tip of which points in the direction of running.

The rows of blocks 1,2 in the shoulder regions are subdivided by transverse grooves 16 into individual tread blocks 17 which are arranged symmetrically with respect to the central circumferential plane 8. The transverse grooves 16 extend substantially in a straight line from the circumferential grooves 4,5 to the lateral edge regions of the tire and have a width which corresponds approximately to the width of the inclined grooves 6 in the vicinity of the circumferential grooves 4,5. Furthermore, the transverse groove 16 extend at an angle of from 65° to 85°, in particular, approximately 75° to the circumferential plane of the tire.

The number of lateral tread blocks 17 is identical to the number of the central blocks 7 and amounts, depending on the tire diameter, to approximately 60–64 tread blocks.

An improvement of the quietness of running is achieved because the lateral profile blocks 17 are not arranged in the circumferential direction of the tire at the same position as the neighboring regions of the central tread blocks 7, but are displaced somewhat rearwardly relative to the latter—as seen in the direction of running. This displacement or offset is so dimensioned that the lateral edges 18 of the central profile blocks 7 bounding the circumferential grooves 4,5 and the lateral edges 19 of the lateral profile blocks 17 bounding the circumferential grooves 4,5 on the other side overlap over approximately 50% of their length, as seen in the circumferential direction of the tire.

The circumferential grooves 4,5 are characterised in that the side edges 18 of the central profile blocks 7 and the side edges 19 of the lateral profile blocks 17 do not extend parallel to but rather at an acute angle to the central circumferential plane 8. This angle amounts for the side edges 18 of the central profile blocks 7 to approximately 6°, whereas the angle between the side edges 19 and the central circumferential plane 8 amounts to approximately 10°. The side edges 18,19, which in other respects are straight, thus diverge—as seen in the running direction of the tire—rearwardly, which makes possible a particularly good discharge of water.

As a result of this arrangement, of the transverse edges of two adjacent tread blocks 17 which bound the transverse grooves 16, the transverse edge of which lies to the rear as viewed in the direction of running, projects somewhat further in the direction of the central circumferential plane 8 than the transverse edge adjacent hereto, so that water which is running rearwardly along the side edge 19 is partly directed by the further projecting transverse edge into the transverse groove 16.

Sipes 20 arranged perpendicularly to the direction of running are formed both in the central tread blocks 7 and also in the lateral tread blocks 17. At least five of these sipes 20 are provided for each block 7,17. They extend up to the maximum depth of the profile, but preferably 80% of such maximum, depth, and merely have a lesser depth at the edge of each block 7,17 in order to increase the stability of the blocks in their marginal regions. The arrangement and the depth of the sipes 20 enable an improvement of the traction in snow, an improved braking action and also an improved self-cleaning of the tread, with the lateral stability of the tread blocks simultaneously being retained.

We claim:

1. A tire comprising a tread including a central region having a central row of profile blocks extending in the direction of the tire circumference and a pair of shoulder regions having shoulder rows of profile blocks, each of said shoulder rows being separated from the central row by a circumferential groove, wherein the profile blocks of the central row are mutually separated by inclined grooves which comprise two groove sections extending at an angle to and meeting each other at the central circumferential plane, and in that each of the two circumferential grooves extends at an acute angle to the tire circumferential plane in the region of the blocks which they bound laterally, and the profile blocks of each of the rows located in the shoulder regions are mutually separated by substantially straight transverse grooves, said transverse grooves extending at an angle of 65° to 85° with respect to the circumferential plane of the tire.

2. The tire according to claim 1, wherein the two groove sections of the inclined grooves are arranged at the same angle with respect to the central circumferential plane at an angle of 40° to 60°.

3. The tire according to claim 1, wherein the inclined grooves widen towards the circumferential grooves, with the boundary walls of the inclined grooves mutually enclosing an angle in the axial direction from 5° to 15°.

4. The tire according to claim 1, wherein a groove section of each inclined groove is extended beyond the other groove section which extends at an angle thereto, by means of a groove extension section, with said groove extension section extending through the half of the block.

5. The tire according to claim 4, wherein the groove extension sections of the inclined grooves alternatively extend from the central circumferential plane toward the one side or the other side of the central circumferential plane.

6. The tire according to claim 5, wherein a connection groove narrower than the groove extension section extends from and in continuation of the groove extension section, in the longitudinal direction thereof, up to the inclined groove which follows in the direction of running.

7. The tire according to claim 1, wherein a groove extension branches off from one groove section of at least one inclined groove, with the groove extension having the same width as and extending preferably perpendicular to this groove section in the direction of the inclined groove located to the rear in the direction of running, with the groove extension extending through the half of the profile block.

8. The tire according to claim 7, wherein a connection groove narrower than the groove extension extends from and in continuation of the groove extension in the longitudinal direction thereof up to the inclined groove located to the rear in the direction of running.

9. The tire according to claim 6, wherein the width of the connection grooves amounts to 30% to 70% of the average width of the inclined grooves.

10. A tire according to claim 1, wherein, proceeding in the tire circumferential direction, every second block of the central row of blocks is geometrically similar.

11. A tire according to claim 1, wherein the side edges of the profile blocks located in the shoulder region which limit the circumferential grooves are arranged with respect to the tire circumferential plane at a greater acute angle than the side edges of the profile blocks of the central row of blocks, such that the circumferential grooves widen in the direction opposite to the direction of running of the tire in the region of the profile blocks which laterally limit the circumferential groove.

12. The tire according to claim 11, wherein the side edges of the profile blocks located in the shoulder region, which limit the circumferential grooves are arranged with respect to the tire circumferential plane at an angle of 5° to 15°, and in that the side edges of the profile blocks of the central row of blocks are arranged with respect to the circumferential plane of the tire at an angle of 2° to 10°.

13. The tire according to claim 1, wherein the number of profile blocks in each of the rows of blocks located in the shoulder regions is equal to the number of profile blocks of the central row of blocks, with the profile blocks being from 56 to 58.

14. The tire according to claim 1, wherein the profile blocks of the rows of blocks located in the shoulder regions are arranged offset in the tire circumferential direction with respect to the profile blocks of the central row of blocks.

15. The tire according to claim 1, wherein the profile blocks of the rows of blocks located in the shoulder regions are symmetrically arranged with respect to the central circumferential plane.

16. The tire according to claim 1, wherein the profile blocks are provided with a plurality of sipes.

17. The tire according to claim 16, wherein the depth of the sipes ranges from 80% of the maximum profile depth to a smaller dimension at the edge of a profile block.

18. The tire according to claim 17, wherein the longer sipes have a smaller depth in their central region.

19. The tire according to claim 2, wherein the two groove sections of the inclined grooves are slightly curved.

20. The tire according to claim 3, wherein the angle enclosed by the boundary walls of the inclined grooves is 10°.

21. The tire according to claim 1, wherein said transverse grooves extend at an angle of 75° with respect to the circumferential plane of the tire.

22. The tire according to claim 16, wherein the plurality of sipes extend perpendicular to the direction of running.

23. The tire according to claim 9, wherein the width of the connection grooves amounts to 50% of the average width of the inclined grooves.

24. The tire according to claim 12, wherein the side edges of the profile blocks located in the shoulder region, which limit the circumferential grooves are arranged with respect to the tire circumferential plane at an angle of 10° and in that the side edges of the profile blocks of the central row of blocks are arranged with respect to the circumferential plane of the tire at an angle of 6°.

25. The tire according to claim 1, wherein the number of profile blocks in each of the rows of blocks located in the shoulder regions is equal to the number of profile blocks of the central row of blocks, with the profile blocks being from 60 to 64.

* * * * *